United States Patent [19]
Blauch

[11] Patent Number: 5,331,155
[45] Date of Patent: Jul. 19, 1994

[54] METHODS OF DETERMINING SUBTERRANEAN FORMATION CHARACTERISTICS USING COMPUTED TOMOGRAPHIC IMAGES

[75] Inventor: Matthew E. Blauch, Duncan, Okla.

[73] Assignee: Halliburton Company, Duncan, Okla.

[21] Appl. No.: 880,439

[22] Filed: May 8, 1992

[51] Int. Cl.$^5$ .............................. G01V 5/04
[52] U.S. Cl. ....................... 250/255; 250/259; 378/4
[58] Field of Search ............ 250/255, 259; 378/4

[56] References Cited

U.S. PATENT DOCUMENTS

| | | | |
|---|---|---|---|
| 4,649,483 | 3/1987 | Dixon, Jr. | 250/256 |
| 4,663,711 | 5/1987 | Vinegar et al. | 378/5 |
| 4,688,238 | 8/1987 | Sprunt et al. | 378/4 |
| 4,799,382 | 1/1989 | Sprunt et al. | 378/4 |
| 5,027,379 | 6/1991 | Hunt et al. | 250/259 |

OTHER PUBLICATIONS

Paper entitled "Direct Measurement Of The Constituent Porosities In Dual Porosity Matrix" presented at the 4th Annual SCA Technical Conference in Dallas, Tex., Aug. 15–16 1990 published in the conference proceedings.

*Primary Examiner*—Carolyn E. Fields
*Attorney, Agent, or Firm*—Robert A. Kent; Cliff Dougherty

[57] ABSTRACT

Methods of determining stimulation related characteristics of a subterranean zone penetrated by a well bore prior to stimulating the zone are provided. The methods basically comprise injecting a small amount of a stimulation fluid having an X-ray contrasting agent admixed therewith into the zone and then obtaining one or more preserved core samples from the zone. The core samples are scanned with X-rays and computed tomographic images are produced for determining the characteristics of the zone.

20 Claims, 1 Drawing Sheet

```
┌─────────────────────────────────────┐
│ INTRODUCE STIMULATION FLUID         │
│ CONTAINING X-RAY CONTRASTING        │
│ AGENT INTO SUBTERRANEAN FORMATION   │
└─────────────────────────────────────┘
                  │
┌─────────────────────────────────────┐
│ OBTAIN ONE OR MORE CORE SAMPLES     │
│ FROM SUBTERRANEAN FORMATION         │
└─────────────────────────────────────┘
                  │
┌─────────────────────────────────────┐
│ SCAN CORE SAMPLES                   │
└─────────────────────────────────────┘
                  │
┌─────────────────────────────────────┐
│ DETERMINE STIMULATION RELATED       │
│ CHARACTERISTICS OF FORMATION FROM   │
│ CT IMAGE DATA                       │
└─────────────────────────────────────┘
```

```
┌─────────────────────────────────────┐
│  INTRODUCE STIMULATION FLUID CONTAINING │
│   X-RAY CONTRASTING AGENT INTO      │
│       SUBTERRANEAN FORMATION        │
└─────────────────────────────────────┘
                  │
┌─────────────────────────────────────┐
│   OBTAIN ONE OR MORE CORE SAMPLES   │
│      FROM SUBTERRANEAN FORMATION    │
└─────────────────────────────────────┘
                  │
┌─────────────────────────────────────┐
│          SCAN CORE SAMPLES          │
└─────────────────────────────────────┘
                  │
┌─────────────────────────────────────┐
│     DETERMINE STIMULATION RELATED   │
│   CHARACTERISTICS OF FORMATION FROM │
│           CT IMAGE DATA             │
└─────────────────────────────────────┘
```

METHODS OF DETERMINING SUBTERRANEAN FORMATION CHARACTERISTICS USING COMPUTED TOMOGRAPHIC IMAGES

BACKGROUND OF THE INVENTION

1. Field of the Invention

The present invention relates generally to methods of determining subterranean formation characteristics, and more particularly, to methods of determining stimulation characteristics of a subterranean formation prior to performing a stimulation treatment therein.

2. Description of the Prior Art

A variety of stimulation procedures have heretofore been developed and used for increasing the production of oil and/or gas from subterranean producing formations. The most common of such procedures involves the creation and propping of fractures in the formation to provide flow passages through which oil and gas can flow from the formation to the well bore, and/or acidizing the formation to increase the permeability thereof or to etch flow channels in the faces of created or natural fractures in the formation. A particular stimulation procedure is selected based on the stimulation characteristics of a subterranean formation or zone to be stimulated, i.e., the type of rock or other material making up the formation, the porosity of the formation, the permeability of the formation, the abundance of natural fractures in the formation, the presence or absence of high permeability streaks or zones in the formation, the rate of fluid loss into the formation while the stimulation procedure is carried out and whether or not the formation permeability is damaged when particular stimulation fluids are utilized. While some of the foregoing characteristics are generally always known about a particular formation or zone to be stimulated, very often a number of important characteristics are not known. As a result, performances of subterranean formation production stimulation treatments are not always successful in increasing the production of hydrocarbons, and sometimes permanent damage in the form of lost permeability and lower production results.

A commonly used technique for determining the characteristics of subterranean formation materials involves the taking of individual core samples from the subterranean formation and testing the samples to determine one or more characteristics of the type described above. The heretofore utilized testing techniques have generally been time consuming, individual samples may be biased due to spatial heterogeneity of the formation and have not provided all of the important characteristics required for determining if a subterranean formation can be stimulated; and if so, how best to accomplish such stimulation.

Recently, X-ray computed tomography (CT) technology has been applied to the determination of subterranean formation properties. Computed tomographic scanning instruments can produce a cross-sectional image of a core sample along any chosen axis. The plane of the image can be moved in discrete intervals to obtain information in three dimensions. Such X-ray computed tomographic scanning has been utilized to determine information useful in enhanced oil recovery and fluid mobility control in subterranean formations. For example, the permeabilities of core samples of formation materials to various fluids at varying conditions of temperature and pressure can be determined. By subtracting the images of the core samples before and after saturation with a particular fluid, the distribution and penetration of the fluid can be determined. The CT scanning technique is non-destructive and can, for example, be conducted while the core sample is contained in a pressurized or other core preservation container.

U.S. Pat. No. 4,649,483 issued Mar. 10, 1987 describes a method of determining the oil, gas and brine content of core samples taken from subterranean formations utilizing computed tomographic scanning. The sample is scanned with X-rays of differing energies in the fluid saturated and fluid extracted states. The computed tomographic images produced are utilized in the determination of the X-ray mass attenuation coefficients for the sample and the extracted fluid. From the mass attenuation coefficients, the weight fractions and volume fractions of each of the extracted fluids are determined.

U.S. Pat. No. 4,688,238 issued Aug. 18, 1987 discloses a method of using computed tomographic scanning on a core sample to determine pore volume changes, pore compressibility and core fracturing over a range of pressures.

U.S. Pat. No. 4,799,382 issued Jan. 24, 1989 discloses methods for determining reservoir characteristics of a subterranean formation core sample. The core sample is subjected to pressure cycling and scanned with X-rays at least once each pressure cycle. Computed tomographic images of the sample for each pressure cycle are produced, and core sample fracturing is determined from the produced images.

While the above described formation core sample testing methods using computed tomography scanning have been useful in determining the subterranean formation properties specified, various formation characteristics useful in determining if a subterranean formation can be stimulated and how best to accomplish such stimulation have not been determined.

Thus, there is a need for improved methods of determining stimulation related characteristics of subterranean formations or zones prior to stimulating the formations or zones.

SUMMARY OF THE INVENTION

By the present invention, methods of determining subterranean formation stimulation related characteristics are provided which overcome the shortcomings of the prior art and meet the need described above. In accordance with the methods, a small quantity of a selected stimulation fluid having an X-ray contrasting agent admixed therewith is injected into a subterranean formation or zone by way of a well bore penetrating the formation or zone. After the injection of the fluid, one or more preserved core samples are taken from the formation or zone. The core samples are scanned with X-rays and computed tomographic images of the core samples are produced showing the stimulation fluid distribution and depth of penetration in the core samples and from which the stimulation related characteristics of the formation can be determined. Such stimulation related characteristics comprise the abundance of natural fractures, the relative permeability, the orientation of created fractures, the rate of fluid loss, the effectiveness of acids in etching flow channels, and the like.

The X-ray contrasting agent used is selected and is present in admixture with the injected fluid in an amount such that a visible contrast between portions of the core samples containing the fluid and portions thereof which do not contain the fluid is provided in the computed tomographic images.

It is, therefore, a general object of the present invention to provide improved methods of determining subterranean formation characteristics.

A further object of the present invention is the provision of improved methods of determining stimulation related characteristics of a subterranean formation or zone penetrated by a well bore prior to stimulating the formation or zone.

Other and further objects, features and advantages of the present invention will be readily apparent to those skilled in the art upon a reading of the description of preferred embodiments which follows.

BRIEF DESCRIPTION OF THE DRAWING

The FIGURE is a flow chart depicting the steps involved in the determination of formation characteristics in accordance with the present invention.

DESCRIPTION OF PREFERRED EMBODIMENTS

As mentioned above, the stimulation of a subterranean hydrocarbon producing zone penetrated by a well bore usually involves increasing the permeability of the producing zone, creating and extending fractures in the zone and propping the fractures open with a particulate material such as sand or etching flow channels in the faces of the fractures. The terms "producing zone" or "zone" are used hereinafter to mean a subterranean producing formation or a producing interval in a subterranean formation. In all of such production stimulation procedures as well as in others, a stimulation fluid is injected into the producing zone. For example, when the permeability of the zone is increased, the stimulation fluid can be an aqueous acid solution which is pumped into the zone at a rate and pressure whereby the zone is not fractured and the acid solution reacts with the materials forming the zone to increase the permeability thereof or remove obstructions to flow through the zone. When fractures are created and extended in the zone, the stimulation fluid is a fracturing fluid of relatively high viscosity. When the fractures are propped open, a particulate propping material is suspended in the fracturing fluid and deposited in the fractures. Examples of fracturing fluids which are commonly utilized include aqueous gels and crosslinked aqueous gels, emulsions, and foams. When the zone is fractured and flow channels are etched in the faces of the fractures, the stimulation fluid is usually a gelled aqueous acid solution or oil external acid emulsion.

An important aspect of a stimulation procedure is the ability of the stimulation fluid to be removed from the producing zone when the stimulated zone is produced, i.e., when hydrocarbons are caused to flow into the well bore and are withdrawn therefrom. When the stimulation fluid used can not be readily removed, the hydrocarbon production ability of the zone can be reduced rather than stimulated.

Depending upon the particular materials making up the hydrocarbon producing zone and the other stimulation related characteristics thereof, a particular stimulation fluid and/or a particular stimulation procedure may be suitable for use or the zone may not be susceptible to being adequately stimulated. For example, if the zone contains highly permeable streaks whereby high losses of the stimulation fluid occur when the fluid is injected into the formation, the formation may not be susceptible to being stimulated as predicted by computer models which may assume uniformity of fluid leak-off.

In accordance with the present invention, the stimulation related characteristics of a subterranean producing zone penetrated by a well bore are determined prior to stimulating the zone. A knowledge of the stimulation related characteristics allows the selection of the optimum stimulation fluid and procedure and prevents or substantially reduces the possibility of failure.

The drawing shows a simplified flow chart of the basic methods of the present invention.

The methods of the present invention basically comprise the steps of:

(1) injecting a small quantity of a stimulation fluid having one or more X-ray contrasting agents admixed therewith into a subterranean producing zone by way of a well bore penetrating the zone;

(2) obtaining one or more core samples from the zone after the stimulation fluid has been injected;

(3) scanning the core samples with X-rays and producing computed tomographic images of the core samples showing the three-dimensional distribution and depth of stimulation fluid penetration in said core samples; and (4) determining the stimulation related characteristics of said zone from the computed tomographic images.

The stimulation fluid that is injected can be any suitable liquid or gas, and a small quantity of the fluid is used whereby only a small portion of the subterranean zone from which core samples can be taken contains the fluid. Generally, the stimulation fluid is injected into the portion of the producing zone adjacent the bottom of the well bore and core samples are taken therefrom. For example, in a vertical or inclined well bore, the stimulation fluid is injected into the producing zone lying adjacent to and below the bottom of the well bore, and at least one core sample is taken from the zone just below the bottom of the well bore. Sidewall cores adjacent the bottom of the well bore can also be taken if necessary or desired. In wells where the producing zone is penetrated by a horizontal portion of a well bore, the fluid is generally injected into the producing zone adjacent to and just beyond the end of the well bore, and core samples are taken in the zone at the end of the well bore.

Most often, the injected stimulation fluid is a non-gelled, gelled, foamed or emulsified hydrocarbon or aqueous liquid depending upon the particular kinds of rock and other materials contained in the producing zone. That is, if the zone is highly water sensitive, e.g., contains highly water sensitive swellable clays, non-gelled, gelled, foamed or emulsified hydrocarbon liquids such as kerosene, diesel oil, mineral oil or lease crude oil are commonly used. When aqueous liquids can be utilized, they generally include non-gelled, gelled, foamed or emulsified brines, salt water, acid solutions, salt substitute solutions, potassium chloride solutions or ammonium chloride solutions. Of the aqueous liquids, fresh water containing about 2% by weight potassium chloride or ammonium chloride to inhibit clay swelling are most often utilized. While the particular small quantity of non-gelled, gelled, foamed or emulsified hydrocarbon or aqueous liquid which is injected into a particular producing zone can vary widely depending upon the properties of the zone, such quantity is generally in the range of from about 0.25 barrels to about 500 barrels.

In computed tomographic (CT) scanning, CT data is derived from the X-ray adsorption coefficient for each pixel element shown in the CT images produced. The CT data is reported as a computed tomography number (CTN) determined in accordance with the following formula:

$$CTN = 1000\left[\frac{(\mu/\rho)_o \rho_o}{(\mu/\rho)_w \rho_w} - 1\right]$$

where:

$(\mu/\rho)_o$ represents the mass attenuation coefficient of fluid in volume element (voxel);

$\rho_o$ represents the density of the fluid;

$(\mu/\rho)_w$ represents the mass attenuation coefficient of water; and $\rho_w$ represents the density of water.

CTN is conventionally expressed in Hounsfield Units (HU) whereby the CTN of water is defined to be 0 HU and the CTN of air is $-1,000$ HU. The equation which relates the measured CTN to the native state core is as follows:

$$CTN_{(measured)} = (1-\phi) \times CTN_c + \phi \times (S_l \times CTN_l + S_g \times CTN_g)$$

where:

$\phi$ represents the native state core material porosity;
$S_l$ represents % of porosity saturated with liquid;
$S_g$ represents % of porosity saturated with gas;
$CTN_c$ represents the CTN of the native state core material;
$CTN_l$ represents the CTN of the liquid; and
$CTN_g$ represents the CTN of the gas.

It can be seen from the above equation that when a stimulation fluid having a high CTN is contained within the porosity of the core material it has a significant impact on the measured CTN.

In accordance with the present invention, one or more X-ray contrasting agents are admixed with the injected stimulation fluid to insure a visible contrast in the CT images produced from the X-ray scanning. The term "admixed" is used herein to mean either that the X-ray contrasting agent is dispersed in the injected fluid or dissolved therein. Generally, the X-ray contrasting agent is selected and is present in admixture with the injected stimulation fluid in an amount such that a visible contrast between portions of the core samples containing the injected fluid and portions thereof which do not contain the fluid is provided in the computed tomographic images.

In selecting the contrasting agent, it is desirable to know the CTN of the native state material making up the subterranean producing zone to be stimulated. This can be obtained from previous X-ray scanning of core samples from the zone or a core sample can be taken from the zone and analyzed using CT scanning prior to selecting a contrasting agent. Generally, contrasting agents which are strong X-ray attenuating substances (have high CTNs) are used. In cases where a core is not available, a close approximation can be made using knowledge of the formation lithology, that is formation type such as limestone, sandstone, dolomite or shale.

Examples of contrasting agents which can be used when the injected stimulation fluid is a liquid or liquid base fluid are potassium iodide, ferric chloride, barium chloride and lithium chloride. Of these, barium chloride is preferred since it is readily available, is relatively inexpensive and produces significant CTN contrast at relatively low concentrations.

When the injected fluid is a gas such as nitrogen, carbon dioxide or commingled nitrogen and carbon dioxide, contrasting agents such as xenon, krypton or other noble gas can be utilized, or the gas can be foamed with a liquid solution of a contrasting agent such as potassium iodide, ferric chloride, barium chloride or lithium chloride.

Particulate solids such as elemental sulfur, hematite or barite can also be advantageously utilized as contrasting agents. For, example, when the stimulation fluid is an aqueous liquid, a soluble contrasting agent such as barium chloride can be dissolved in the stimulation fluid and a particulate solid such as barite can be suspended therein. When the stimulation fluid containing the dissolved and suspended contrasting agents is injected into a subterranean zone, the suspended solids will flow into natural or created fractures but generally will not flow through the pores of the material making up the zone. This allows fluid flow by way of the natural porosity of the material to be distinguished from fluid flow into natural or created fractures in the material. The contrasting agent or agents are generally admixed with the stimulation fluid used in an amount in the range of from about 0.05% to about 20% by weight or saturation of the resulting mixture or solution.

The core samples obtained from the subterranean zone after the stimulating fluid containing an X-ray contrasting agent or agents has been injected in the zone are preferably pressure core samples, i.e., core samples preserved at the downhole pressure at which they were taken. However, core samples preserved at atmospheric pressure can also be used when the stimulation fluid is substantially non-compressible and non-volatile at the conditions encountered. The core samples are analyzed in their preserved states by X-ray computed tomography scanning using an X-ray CT apparatus and techniques known to those skilled in the art. Generally, the CT images are produced for visualization in a series of $512 \times 512$ picture element (pixel) images. The injected fluid three-dimensional distribution and depth of penetration in the core samples is shown by the images, and various other stimulation characteristics of the subterranean zone can be determined from the images including the abundance of natural fractures in the zone, the relative permeability contrast of the zone, the rate of fluid loss to the zone when performing a stimulation procedure, the orientation of fractures if created and extended in the zone, the rate of fluid loss during such fracturing, and the like. In addition, when the injected fluid contains one or more acids for increasing the permeability of the zone or etching flow channels therein, the effectiveness of the acid, the worm hole distribution, effective etched length along the created fracture and the rate of fluid loss can be determined. As mentioned, a knowledge of the various stimulation characteristics of a subterranean zone to be stimulated allows the optimum stimulation fluid and stimulation procedure to be selected and performed in the zone.

Because the stimulation fluid injected into the producing zone in accordance with this invention is injected under actual down hole conditions and the core samples taken from the zone are X-ray scanned in a preserved state, the stimulation related characteristics determined are highly accurate. Also, the use of one or more X-ray contrasting agents in the fluid allows the distribution and depth of penetration of the fluid in a core sample as well as other stimulation characteristics thereof to be readily and accurately determined from the CT images produced.

Another important factor to be considered in selecting the stimulation fluid is the degree to which that fluid can be removed from the subterranean zone after the stimulation procedure has been performed. This factor can also be determined in accordance with the methods of the present invention. That is, after a subterranean zone has been injected with a stimulation fluid containing one or more contrasting agents and one or more core samples have been obtained, the well is produced so that hydrocarbon fluids contained within the producing zone are flowed into and removed from the well bore. Once a quantity of hydrocarbon fluids have been produced such that the stimulation fluid used should be removed from the zone, one or more additional core samples are obtained from the zone. Those core samples are then scanned with X-rays and CT images are produced. By comparing the CT images obtained from the core samples taken after the injection of the stimulation fluid with the CT images produced from the core samples taken after the well was produced, the extent of removal of the stimulation fluid from the zone can be determined. If the stimulation fluid is shown to be effectively removed, it is a good selection. If substantial portions of the stimulation fluid remain in the zone, the stimulation fluid is probably not suitable for stimulating the zone involved.

Other stimulation related producing zone characteristics and factors which are not specifically described herein and can be determined using the methods of this invention will readily suggest themselves to those skilled in the art. For example, the methods can be used to determine if a zone lying adjacent to the producing zone is permeable or substantially impermeable to the stimulation fluid utilized.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of determining stimulation related characteristics of a subterranean producing zone penetrated by a well bore prior to stimulating said zone comprising the steps of:
   (a) injecting a quantity of a stimulation fluid having an X-ray contrasting agent admixed therewith into said zone by way of said well bore;
   (b) obtaining one or more preserved core samples from said zone;
   (c) scanning said one or more core samples with X-rays and producing computed tomographic images of said one or more core samples; and
   (d) determining said characteristics of said zone from said computed tomographic images.

2. The method of claim 1 wherein said stimulation fluid is comprised of a liquid or gas.

3. The method of claim 2 wherein said X-ray contrasting agent is selected and is present in admixture with said stimulation fluid in an amount such that a visible contrast between portions of said one or more core samples containing said fluid and portions thereof which do not contain said fluid is provided in said computed tomographic images.

4. The method of claim 1 wherein said stimulation fluid is comprised of a liquid selected from the group consisting of hydrocarbon liquids and aqueous liquids.

5. The method of claim 1 wherein said X-ray contrasting agent is a compound selected from the group consisting of potassium iodide, ferric chloride, barium chloride and lithium chloride.

6. The method of claim 1 wherein said X-ray contrasting agent is a particulate solid comprising at least one member selected from the group consisting of elemental sulfur, hematite and barite.

7. The method of claim 1 wherein said stimulation fluid is a gas and said X-ray contrasting agent comprises at least one member selected from the group consisting of xenon and krypton.

8. The method of claim 1 wherein said fluid is injected into said zone in accordance with step (a) at a pressure below the pressure at which one or more fractures are initiated therein, and said stimulation related producing zone characteristics determined in accordance with step (d) comprise the abundance of natural fractures in said zone and the permeability of said zone.

9. The method of claim 1 wherein said fluid is injected into said zone in accordance with step (a) at a pressure above the pressure at which one or more fractures are initiated therein, and said stimulation related producing zone characteristics determined in accordance with step (d) comprise the orientation of said fractures and the rate of fluid loss in said zone during fracturing.

10. The method of claim 1 wherein said fluid is an aqueous acid solution and said stimulation related producing zone characteristics determined in accordance with step (d) comprise the effectiveness of said acid solution in etching flow channels in said zone and the rate of fluid loss in said zone during said etching.

11. A method of determining stimulation related characteristics of a subterranean zone penetrated by a well bore comprising the steps of:
   (a) pumping a stimulation liquid having one or more X-ray contrasting agents admixed therewith into said zone at a preselected rate and pressure in an amount in the range of from about 0.25 barrels to about 500 barrels;
   (b) obtaining and preserving one or more core samples from said zone;
   (c) scanning the preserved one or more core samples with X-rays and producing computed tomographic images of said one or more core samples showing the distribution and depth of stimulation fluid penetration in said one or more core samples; and
   (d) determining said characteristics of said zone from said computed tomographic images.

12. The method of claim 11 wherein said stimulation liquid comprises an aqueous solution containing potassium chloride or ammonium chloride in an amount of about 2% by weight of the solution.

13. The method of claim 12 wherein said one or more X-ray contrasting agents comprise barium chloride admixed with said stimulation liquid in an amount in the range of from about 0.05% to about 20% by weight of the resultant mixture or solution.

14. The method of claim 13 wherein said stimulation liquid is injected into said zone in accordance with step (a) at a pressure below the pressure at which one or more fractures are initiated therein, and said stimulation related producing zone characteristics determined in accordance with step (d) comprise the abundance of natural fractures in said zone and the permeability distribution of said zone.

15. The method of claim 13 wherein said stimulation liquid is pumped into said zone in accordance with step (a) at a pressure above the pressure at which one or more fractures are initiated therein, and said stimulation related producing zone characteristics determined in accordance with step (d) comprise the orientation of said fractures and the rate of fluid loss in said zone during fracturing.

16. The method of claim 13 wherein said stimulation liquid further comprises one or more acids for reacting in said zone and said stimulation related producing zone characteristics determined in accordance with step (d) comprise the effectiveness of said stimulation liquid in reacting in said zone and the rate of fluid loss in said zone during said reacting.

17. A method of determining stimulation related characteristics of a subterranean zone penetrated by a well bore comprising the steps of:
    (a) injecting a quantity of a stimulation fluid having one or more X-ray contrasting agents admixed therewith into said zone by way of said well bore;
    (b) obtaining one or more core samples from said zone;
    (c) scanning said one or more core samples with X-rays and producing computed tomographic images of said one or more core samples;
    (d) producing fluids contained within said zone into and from said well bore;
    (e) obtaining one or more additional core samples from said zone;
    (f) scanning said additional one or more core samples with X-rays and producing computed tomographic images of said additional one or more core samples;
    (g) comparing the images of step (c) with the images of step (f) to thereby determine the extent of removal of said stimulation fluid from said zone.

18. The method of claim 17 wherein said one or more X-ray contrasting agents are selected and are present in admixture with said fluid in an amount such that a visible contrast between portions of said one or more core samples containing said stimulation fluid and portions thereof which do not contain said fluid is provided in said computed tomographic images.

19. The method of claim 18 wherein said stimulation fluid comprises a liquid selected from the group consisting of hydrocarbon liquids and aqueous liquids.

20. The method of claim 19 wherein said one or more X-ray contrasting agents are selected from the group consisting of potassium iodide, ferric chloride, barium chloride, lithium chloride, elemental sulfur, hematite, barite and mixtures of two or more of said agents.

* * * * *